United States Patent
Reith, III.

(10) Patent No.: US 8,824,285 B1
(45) Date of Patent: Sep. 2, 2014

(54) SYSTEM AND METHOD FOR COLLISION DETECTION AND AVOIDANCE DURING PACKET BASED COMMUNICATIONS

(75) Inventor: Howard C. Reith, III., Lee, NH (US)

(73) Assignee: Dnutch Associates, Inc., Methuen, MA (US)

( * ) Notice: Subject to any disclaimer, the term of this patent is extended or adjusted under 35 U.S.C. 154(b) by 481 days.

(21) Appl. No.: 12/968,377

(22) Filed: Dec. 15, 2010

Related U.S. Application Data

(60) Provisional application No. 61/287,153, filed on Dec. 16, 2009.

(51) Int. Cl.
*H04L 12/26* (2006.01)
*H04L 12/28* (2006.01)
*H04W 24/00* (2009.01)

(52) U.S. Cl.
CPC .................................. *H04W 24/00* (2013.01)
USPC ......... 370/230; 370/252; 370/395.4; 370/428

(58) Field of Classification Search
USPC ......................................... 370/230–252, 468
See application file for complete search history.

(56) References Cited

U.S. PATENT DOCUMENTS

| | | | |
|---|---|---|---|
| 5,905,871 A * | 5/1999 | Buskens et al. | 709/245 |
| 7,508,813 B2 | 3/2009 | Rogers | |
| 7,725,594 B2 | 5/2010 | Jia et al. | |
| 2002/0089930 A1 * | 7/2002 | Aceves et al. | 370/230 |
| 2005/0058149 A1 * | 3/2005 | Howe | 370/428 |
| 2006/0114834 A1 * | 6/2006 | Cheung et al. | 370/252 |
| 2009/0059958 A1 * | 3/2009 | Nakata | 370/474 |

OTHER PUBLICATIONS

Christina Parsa, Improving TCP Congestion Control over Internets with Heterogeneous Transmission media, 1999, IEEE, pp. 1-11.*

* cited by examiner

*Primary Examiner* — Steven H Nguyen
(74) *Attorney, Agent, or Firm* — Burns & Levinson LLP; Orlando Lopez

(57) ABSTRACT

A system and method for collision detection and avoidance that converts a probabilistic, packet based communications system into a deterministic packet based communications system. The system and method operates in packet, frame, or datagram based network environments that support different levels of forwarding priority, for example, IP networks and Ethernet networks.

18 Claims, 15 Drawing Sheets

Information Transmission System Embodiment

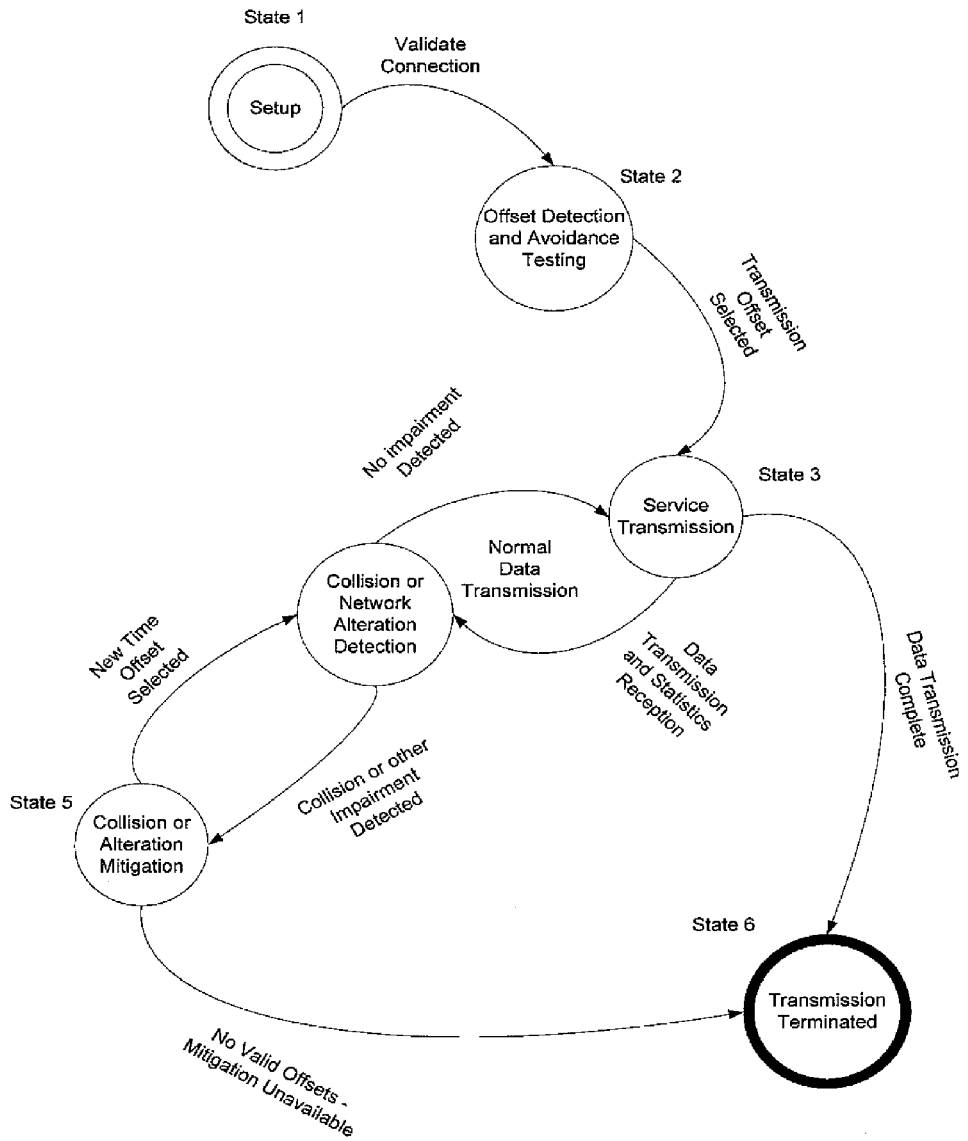
Figure 4 Data Source State Diagram

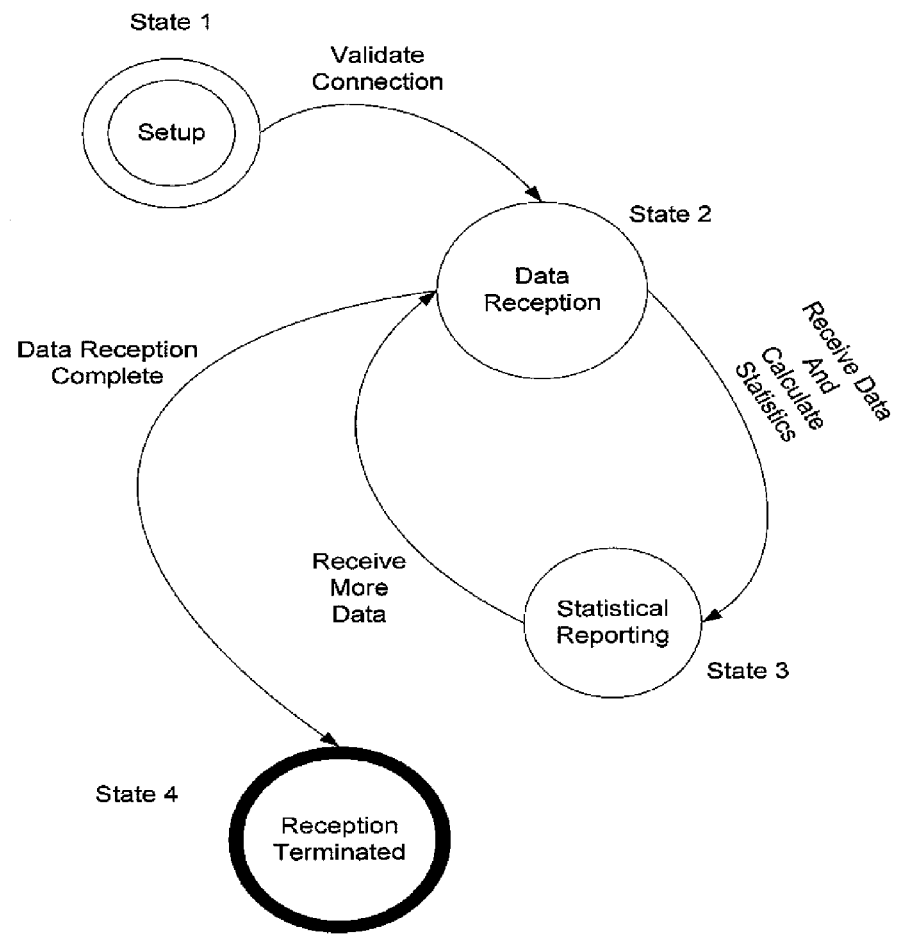
Figure 5 Data Sink State Diagram

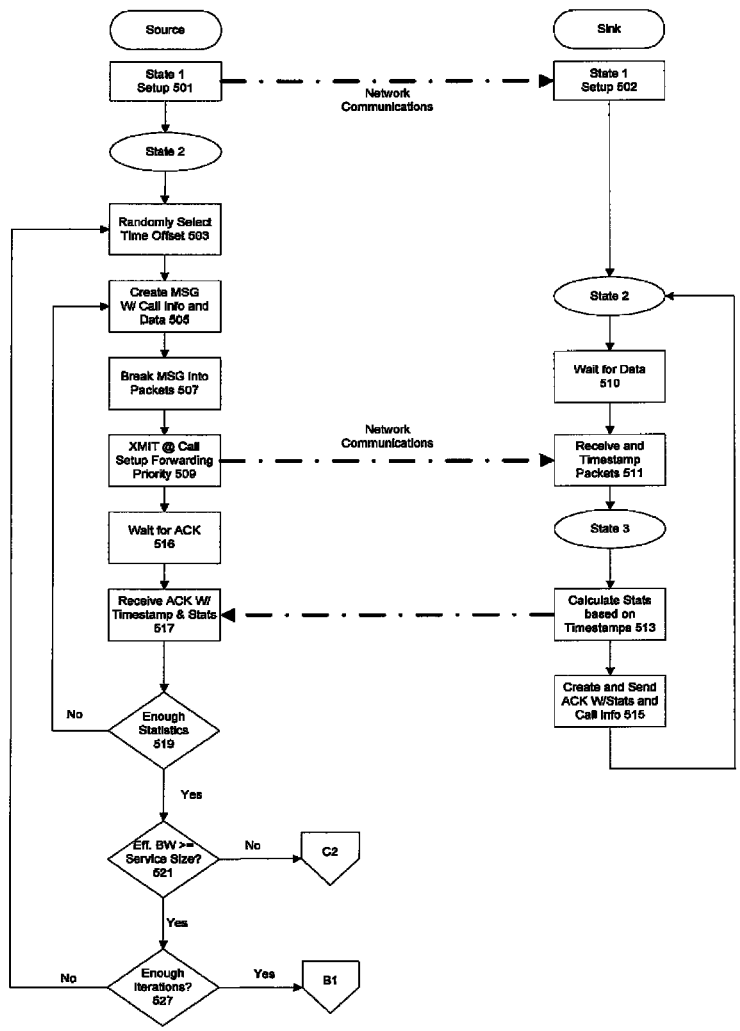
Figure 6A Chart of Methods of Embodiment

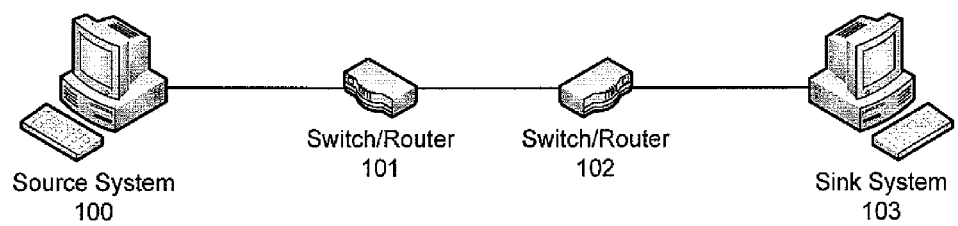
Figure 8 Sample Communications System

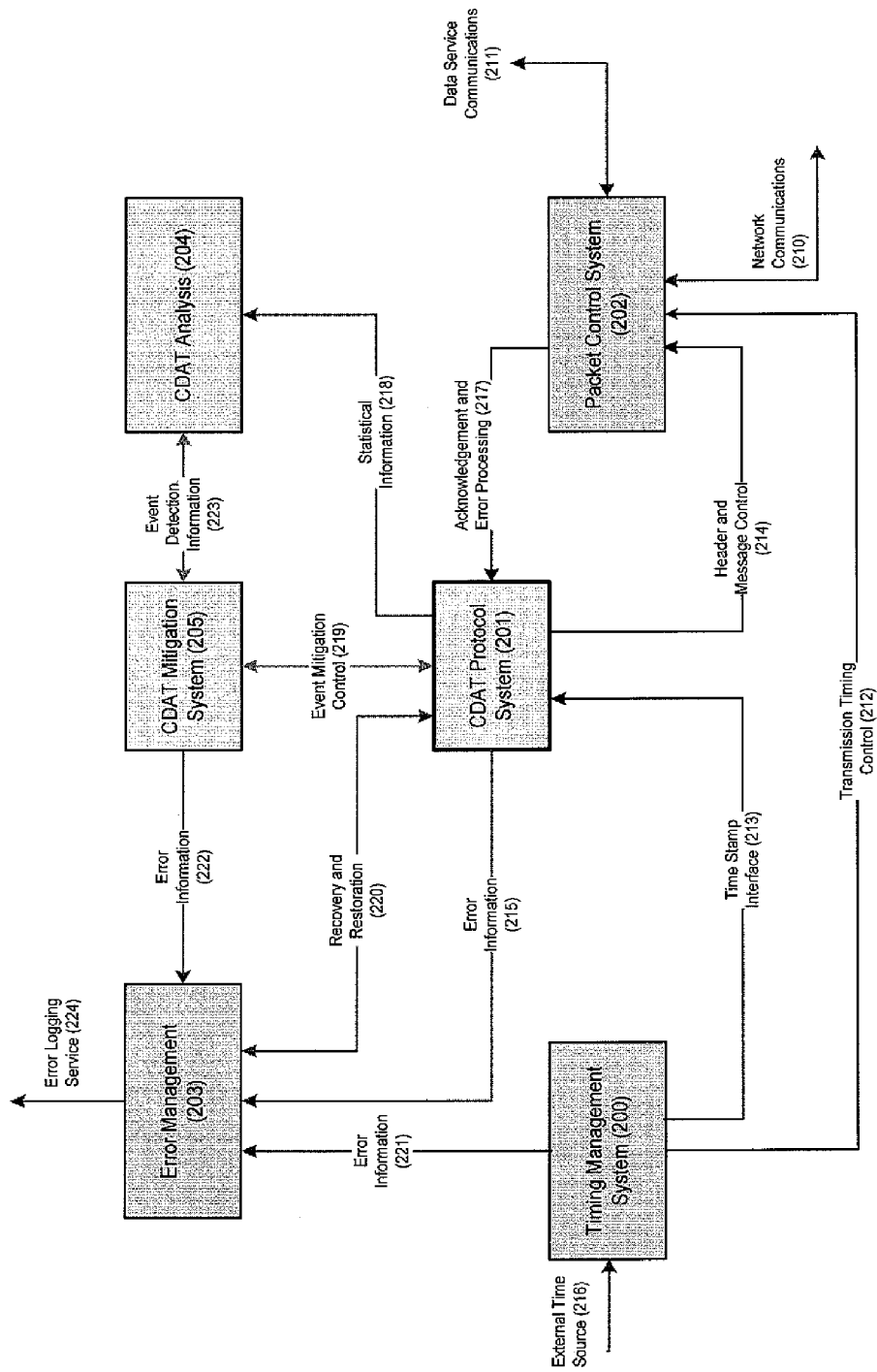
Figure 9 Data Source Component Interaction Architecture

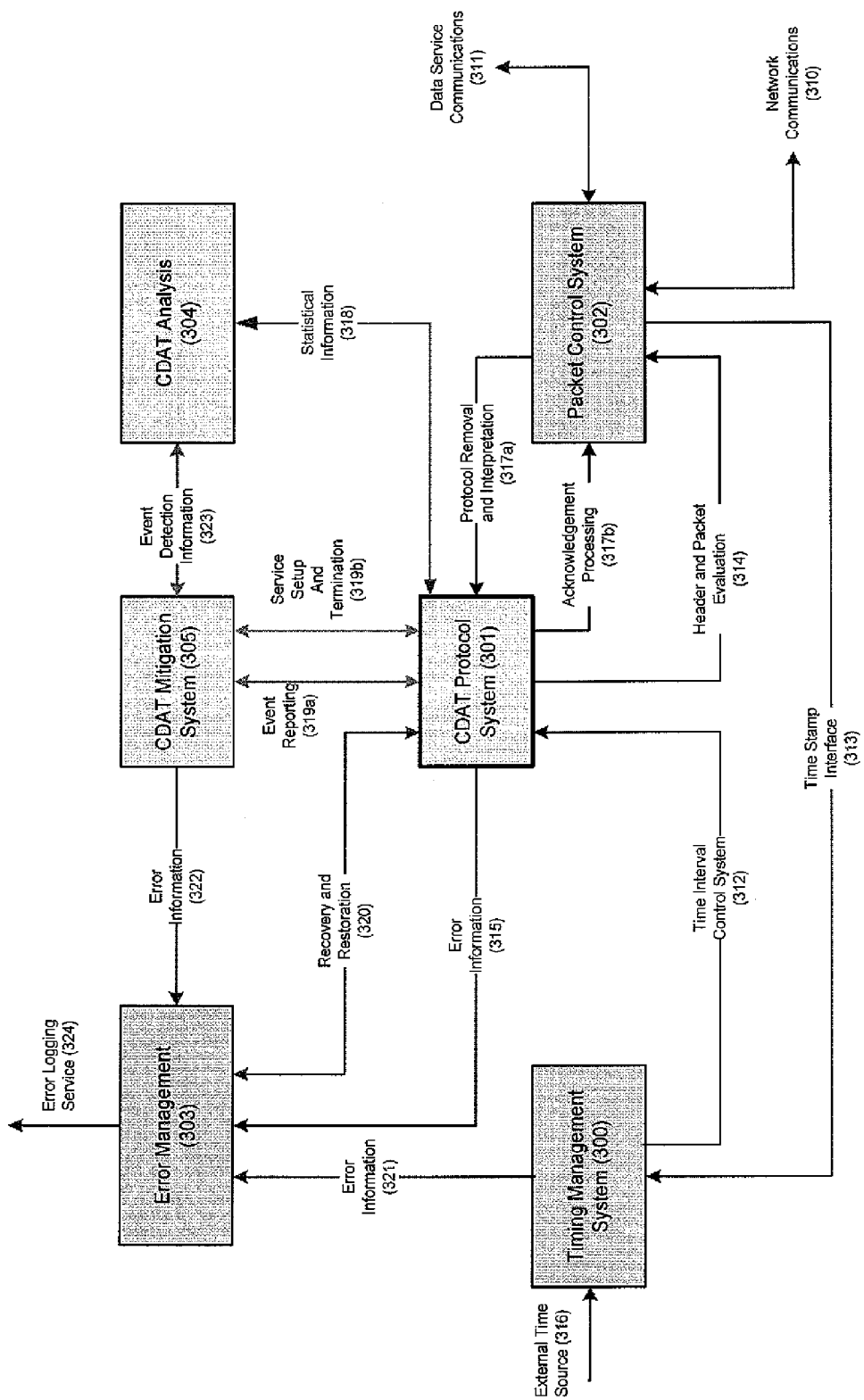
Figure 10 Data Sink Component Interaction Architecture

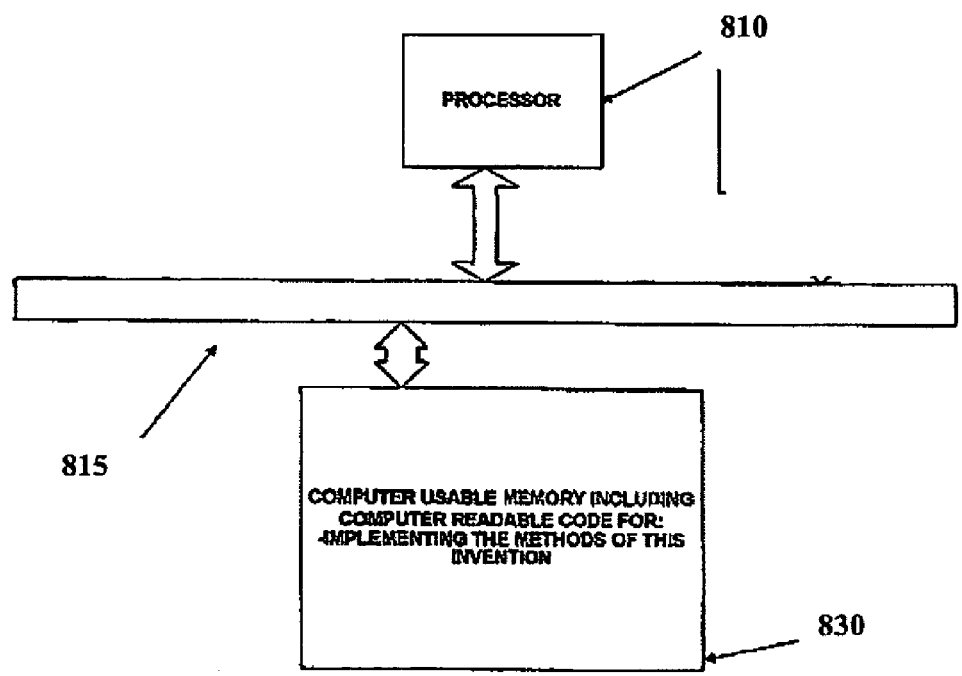
Figure 11 Sample Embodiment of the Transmitter/Receiver System

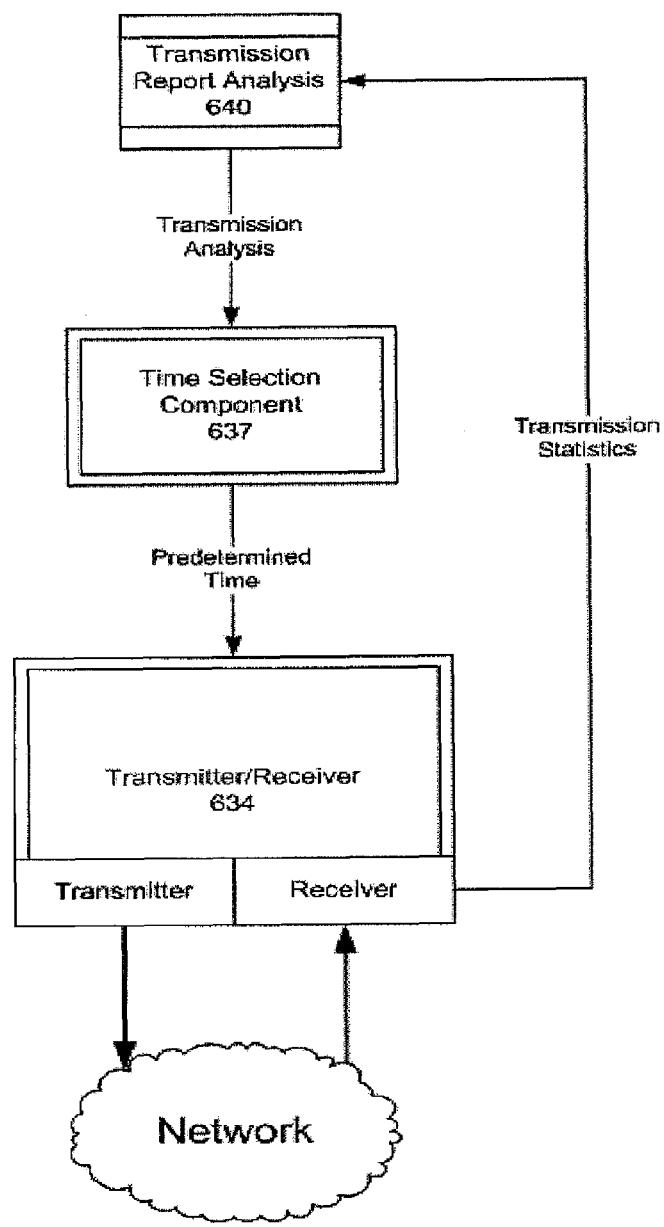
Figure 12 Information Transmission System Embodiment

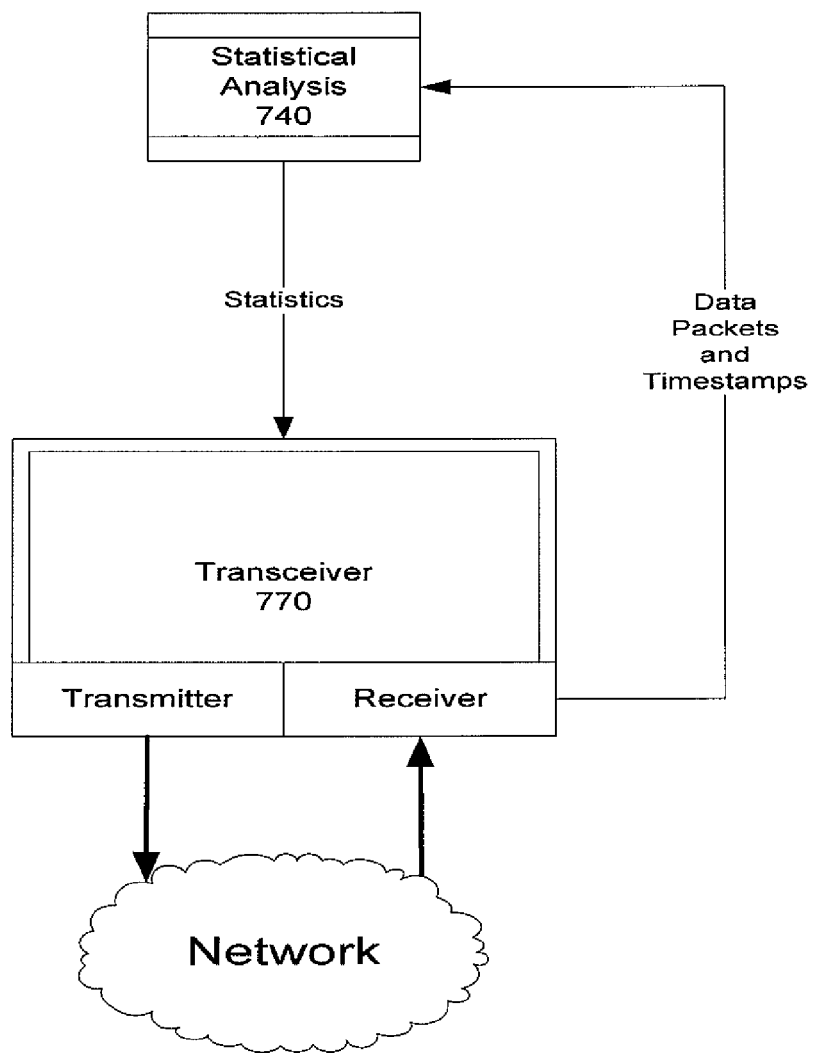
Figure 13 Information Receiving System Embodiment

SYSTEM AND METHOD FOR COLLISION DETECTION AND AVOIDANCE DURING PACKET BASED COMMUNICATIONS

CROSS-REFERENCE TO RELATED APPLICATIONS

This application claims priority to U.S. Provisional Patent Application Ser. No. 61/287,153, entitled SYSTEM AND METHOD FOR COLLISION DETECTION AND AVOIDANCE FOR NETWORK COMMUNICATIONS, filed Dec. 16, 2009, the content of which is hereby incorporated by reference in its entirety for all purposes.

BACKGROUND

The system and method of the present embodiment relate generally to delivering data packets across a shared medium communications network by first using algorithms to detect communications interactions (collisions) and subsequently using different algorithms to avoid these communications interactions, thereby converting the communications system from a probabilistic communications environment into a deterministic communications environment.

Quality of packet, frame, or datagram based (hereafter simply referred to as packet based) communications can be affected if the communications system is probabilistic in nature. A non-deterministic or probabilistic system can allow packets from one service to collide with packets from another network services (two or more data packets attempting to use the same communications resource at the same time), resulting in service contention at network choke points. This contention can result in communications degradation through packet loss, excessive delay, and enhanced jitter (change in delay). Further, loss of quality can occur at any point during the service transmission. Therefore, a communication service that starts out working with no contention may experience significant contention and quality degradation at some point during its communications session.

While it is possible to use different priority levels in an attempt to improve communications, using priority levels alone does not remove the probabilistic nature of packet based communications; priorities just improve the probabilities of one service at the expense of another service. Further, a service may attempt to mitigate contention through reducing data rates, adding error correction information, or a combination of these techniques. These adjustments either reduce service quality (through reduced data rates) or increase bandwidth requirements (through error correction information), yet these efforts do not remove the probabilistic nature of the communications medium. Even further, other systems may attempt to mitigate contention through a "training" period where an endpoint investigates potential contention before adding traffic to the network environment. The endpoint then uses that information to control its traffic insertion. However, this technique fails if the underlying network environment changes during the communications session (for example, a link is lost and traffic is shunted to another path, or an over-the-air—e.g. satellite or microwave—path experiences noise and data rate degradation), making obsolete the information gathered during the training period. A further contention mitigation attempt uses a centralized control system to manage when services can insert their traffic into the network. Managed networks remove the autonomous nature of packet based communications while adding a limit to service setup speed and limiting system scalability.

Further, probabilistic communications environments reduce the communications environment ability to offer various communications features and capabilities. For example, if priority is used to reduce probabilistic interactions of different service types, it removes the environment's capability of allowing preemption of communications within a service type or across service types. Consider a network that uses four priority levels to separate out contention between different services. The highest priority (e.g. priority 3) may be reserved for network control and management; the second highest (e.g. priority 2) may be reserved for voice traffic; the third highest (e.g. priority 1) may be reserved for video traffic; while the lowest priority is reserved for all other traffic. If a video service must preempt all other video services (for example, it is an emergency or other critical video), it could not do so at priority 1. Therefore, it would need to increase its priority to 2, where it would interfere with and interact with all of the voice traffic. While the video would preempt other video traffic, it would still be interfered with by voice traffic, and therefore not be deterministic. The video could attempt to increase its priority even further to priority 3, but it would then contend with management traffic. If a management service needed to preempt other management services, it would need to increase its priority above 3, which is not possible. This is an example of how a non-deterministic environment could not provide a preemption option to its various services since preemption would still not be deterministic, and would either interfere with other services or not have a priority that would be used for preemption. Non-deterministic communications reduces the quality of data services across the network. Services cannot guarantee data delivery and therefore they cannot provide truly high-availability communications, provide the highest security levels, fully utilize the underlying network infrastructure, and allow the network owner to manage the communication services as true services instead of as packet streams.

What is needed is a system and method that allows communications services on a packet based, shared medium network to work in a deterministic manner, resulting in superior and predictable communications quality. What is further needed is a system and method that can enable detection and avoidance of packet collision, thus eliminating resource contention at network choke-points. What is still further needed is a system and method that can detect changes in the underlying communications environment while a service is active (and at any point during the communications' lifetime) and adjust services to those changes, reestablishing full determinism to the services using that communications environment. What is still further needed is a system and method that can detect and adjust to contention automatically and completely autonomously, and therefore does not need a separate training period or central server to control data insertion into the network.

What is even still further needed is a system and method that provides deterministic communications and therefore allows all services access to all features and capabilities of the communications environment. What is still further needed is a system and method that allows service preemption based on service preemption needs, not on service type. What is even further needed is a system and method that allows deterministic communications of all services, therefore allowing management of those services as data services and not as packet streams. Finally, what is needed is a system and method that provides all of these capabilities without having to manage, manipulate, change, configure, alter, train, analyze, control, or otherwise affect the core communications infrastructure to enable existing, new, or evolving communications services to function in a deterministic and consistent manner.

SUMMARY

The needs set forth above as well as further and other needs and advantages are addressed by the embodiments set forth below.

The embodiment describes a system and method for deterministically delivering packets across a network, based on first using a time-based resource reservation scheme to control data transmissions. Next, using statistics and algorithms for detecting data stream interaction within the communications channel. Finally having the source adjust its transmission timing and thereby avoid data stream interactions that would otherwise adversely affect the quality of bearer traffic.

The data source inserts its data traffic at consistent and controlled intervals. The data receiver continuously evaluates the timing statistics of the received packets, looking for packet loss, delay, jitter (changes in delay), and other communications impairments. The data source is constantly informed of the statistical analysis and it can adjust its transmission timing if the statistics indicate an impairment of the received data. Consequently, what would otherwise be probabilistic performance can be converted into a deterministic performance since the system detects, and then avoids service contention, and thereby eliminating the impairments caused by that contention. The approach is operative in both packet and frame-based network environments (for example, Internet Protocol, Ethernet, and other datagram based communications on a shared medium), and permits several different preemption levels for forwarding traffic from a transmitting endpoint appliance or network edge-point to a receiving endpoint appliance or network edge-point.

For a better understanding of the present embodiments, together with other and further objects thereof, reference is made to the accompanying drawings and detailed description.

DESCRIPTION OF THE DRAWINGS

FIG. 2A uses a line to indicate time, with time increasing to the right. A unit of time is marked off and is indicated as the Common Time Interval. All systems using the described technology within a given networked communications environment would all use the same Common Time Interval. The time interval can be of any value that is convenient for the underlying communications and applications. Intervals tend to be short, on the order of 10-50 milliseconds, to reduce the delay associated with accumulating the data into packets prior to transmissions. FIG. 2b shows the environment when a single service starts transmitting into the otherwise unused network. Note that the transmissions occur regularly with the intervals and also that the transmission occurs at the same relative position within the interval. FIG. 2c shows the established Autonomous Chronological Service (ACS) continuously transmitting on its time offset.

FIG. 3a shows the established ACS transmitting on its offset. FIG. 3b shows the second service attempting to transmit at two different times during its initial startup transmission. FIG. 3c shows the packets as received by the receiver. Note that the first block of packets is delayed since the transmission collided with the already establish ACS. The second block of packets did not collide with the established ACS and therefore did not experience any delay. The service would choose the second time offset since it did not experience any impairments (in this case a delay).

FIG. 4 is a state diagram that shows the states the transmission system can be in and the transitions between various states.

FIG. 5 is a state diagram that shows the states the receiving system can be in and the transitions between the various states.

FIG. 6A-C presents a flowchart that depicts an algorithms that implements the methods for the embodiment described herein. The flowcharts show the actions of both the Source (on the left of the charts) and the Sink (on the right) and indicate the interactions between the Source and Sink. In addition, the flowcharts show where in the activities the states change, which represents the states indicated in FIG. 4 and FIG. 5.

FIG. 7A depicts the timing of the original ACS. FIG. 7B shows the relative timing of the original ACS and the new, preempting ACS. FIG. 7C shows the timing of the ACS as received at the first data sink. Note in FIG. 7C a gap in the packet arrival times. This gap is known as a "shadow" and the shadow indicates a preemption event.

FIG. 8 is a sample communications system that embodies the system and methods described herein. This sample system is a simple embodiment, but is by no means the only possible embodiment. The current technology can be used on simple environment with a small number of endpoints and network elements to extremely complex network environments encompassing thousands (or even millions) of endpoints and hundreds or thousands of network elements. The sample system is used for illustrative purposes. Source System 100 will insert ACS traffic into the network represented by Switch/Routers 101 and 102. The Sink System 103 receives the ACS data, performs the statistical analysis and reports the results back to 100. All embodiments can be viewed as replications of these simple building blocks. That is, all embodiments consist of a Source, a Sink, and a Network.

FIG. 9 is a block diagram of the data service Source. It depicts the functional blocks that the system uses to implement the various methods of the described embodiment. Note that the Source is both a transmitter and receiver, in that it transmits ACS and other data, and receives statistics, acknowledgements, and other data.

FIG. 10 is a block diagram of the data service Sink. It depicts the functional blocks that the system uses to implement the various methods of the described embodiment. Note that the Sink is both a receiver and a transmitter, in that it receives ACS and other data, and it transmits statistics, acknowledgements, and other data.

FIG. 11 is a block diagram of a sample embodiment of a transmitter and receiver system. This embodiment could be used as a Source, a Sink, or both.

FIG. 12 is a block diagram of a sample embodiment of the Information Transmitting System.

FIG. 13 is a block diagram of a sample embodiment of the Information Receiving System.

DETAILED DESCRIPTION

Definitions and Acronyms

Figure 1:
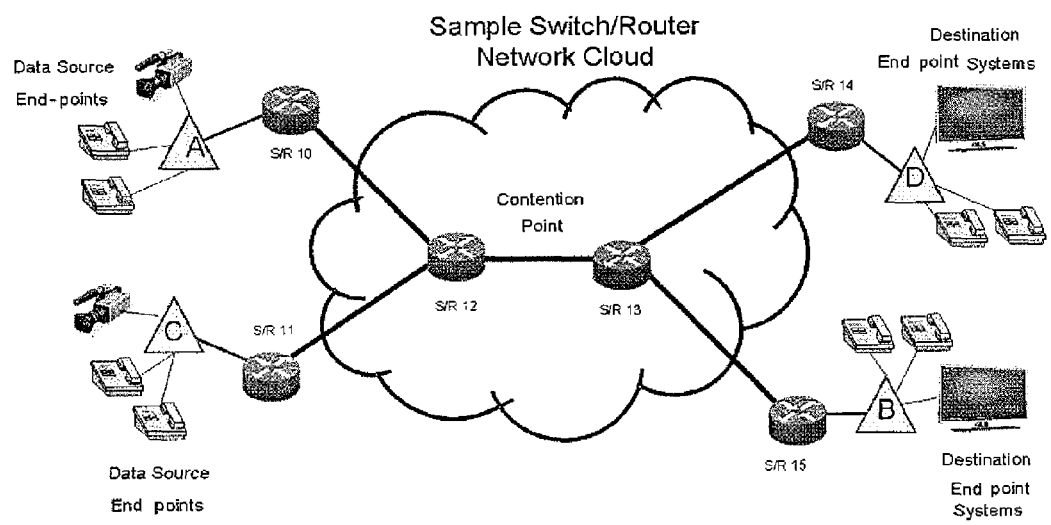
FIG. 1 is a diagram of a sample network that will be used in the discussion of the embodiment. The diagram indicates four endpoint systems labeled A, B, C, and D. Endpoint systems A will attempt to send data to Endpoint B, while C will send data to D. The source endpoints can send any form of data source, for example, but not limited to, audio, video, database data, web page data, file data, and so forth; the diagram indicates video and audio data. The diagram indicates a number of switch/router network elements (elements 10-15). The elements 12 and 13 are connected via a single communications link. That connection is a potential network choke point, where service packets may interact while attempting to get network resources (the resource being the outbound data link). Other contention points may exist in the network but they are not shown here for brevity and ease of discussion.

Several specialized terms and acronyms are used in this document, which are defined in the table below:

| | |
|---|---|
| Network | For this document, a network refers to a communications environment where two or more devices can communicate by exchanging data "packets". The network consists of a number of elements or nodes that can do one or more of source data, sink (terminate) data, or receive and forward data. There may be other nodes within the network, such as monitoring and management nodes; these nodes are beyond the scope of this document except for when that are sending or receiving data. Data traverses the network using "packet switching" as opposed to circuit switching. |
| Packet | A packet of data is a block of data organized in a protocol-defined fashion. Examples of packet-based communications include, but not limited to, Internet Protocol (IP), Ethernet, X.25, and Asynchronous Transfer Mode (ATM). |
| Packet Switch Network (PSN) | A packet switch network is a communications environment where data is moved across the network as packets. The intermediate nodes, in the communications environment use part of the data in the packet to make decisions as to how to forward the packet. That is, a packet is received on an input port, the destination address is extracted from the packet and examined, and the intermediate node uses that address to determine which of several output ports the system should use in forwarding the packet. Therefore, the packet is switched from an input port to an output port. |
| Data Source | A data source is a communications "endpoint" that is the starting point of a communications "service" and inserts data into a packet switch network. |
| Data Sink | A data sink is a communications "endpoint" and is the ending point of a communications "service" and receives and removes data from the packet switch network |
| Service | A service is the term used for a communications application where two or more "endpoints" are communicating. A service consists of a single data source and one or more data sinks. A bidirectional service consists of endpoints that are both data sources and data sinks. For example, a video system that is delivering movies to users is a unidirectional service, with the movie server as the source and the users watching the movie are the sinks. A video conference, on the other hand, is an example of a bidirectional service, since both users send and receive video and audio data. A bidirectional service can also be viewed as two unidirectional services. |
| Packet Queuing | A packet switched network receives data packets autonomously from the various data sources. Since it is possible that multiple packets might need to use the same output port at the same time, a network forwarding element will store some packets while it is transmitting others. Typically, the system will store packets in a first-in, first-out (FIFO) fashion, similar to a queue at a bank or ticket counter. Packets waiting to a transmission resource are said to be on a queue. Forwarding systems do not have unlimited capacity, and at times the queue may be full when a new packet arrives to be placed on the queue. The forwarding system must either discard the newly arrived packet since there is no room on the queue, or discard a packet waiting on the queue to make room for the new packet. This packet discarding is known as queue overflow. Note that packets may also be lost within a network due to environment noise or hardware malfunction. |
| Collision | When multiple data services attempt to use the same communications resource at the same time, the services are said to have collided. Service collisions cause impairments to the communications that are colliding. In a probabilistic communications environment, the sources are autonomous and asynchronous. Service interactions are probabilistic in nature, and service impairments are therefore probabilistic and not deterministic. |
| Probabilistic Communications | In a probabilistic communications system, there is a finite probability the communications data will be impaired prior to reaching the data sink. In a packet switched network, the impairments include packet discard (packet loss), packet delay, packet jitter (changes in delay), packet reordering (that is packets arrive at the sink in a different order than the order used during transmission by the source), and other such impairments. In a probabilistic network, the impairments are unbounded, but tend to meet some probabilistic distribution. Most of the impairments are due to resource contention, such as packet queues and transmitter bandwidth. |

Figure 2:
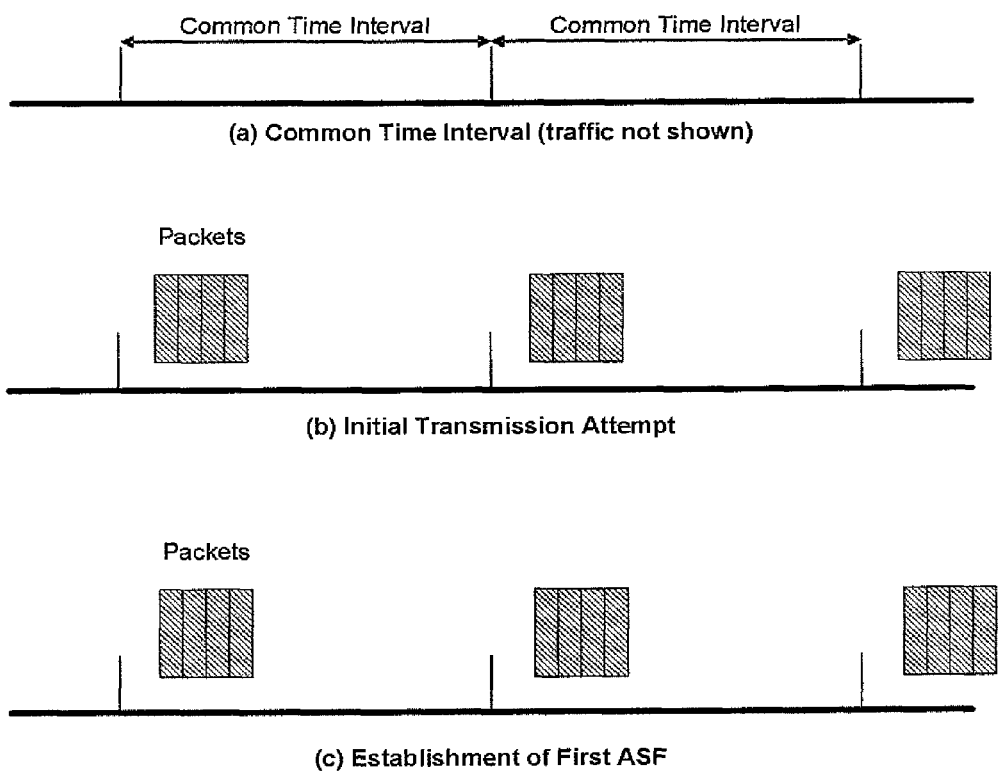
FIG. 2 shows how timing is part of the transmission system.

| | |
|---|---|
| Deterministic Communications | With a probabilistic communications environment, it is impossible to determine with complete certainty network utilization, resource contention, or the ability of the network to deliver accurately the data from source to sink. In a deterministic communications system, the impairments experienced by the data packets are bounded and predictable. A deterministic system does not experience packet loss due to queue overflows. In addition, with a deterministic communications environment, it is possible to determine network utilization, resource contention, and the ability of the network to deliver data accurately. |
| QoS | Quality of Service - the level of quality a particular communications service will experience on the network. In a probabilistic communications environment, QoS refers to the impairment probabilities a service will experience. It also refers to the various techniques used (such as prioritization, communications path management, and over provisioning) to adjust impairment probabilities. In a deterministic environment, traditional PSN QoS does not apply, since services do not experience probabilistic impairments. |
| Service Preemption | There may be times when more services desire network access than the network can support (over subscription). Preemption refers to a particular service that has higher access priority than other services and therefore receives preferential use of the network. The higher priority service will continue to communicate while one or more low-priority (preempted) services must terminate to yield their bandwidth to the high priority service. |
| Autonomous Chronological Service (ACS) | In the current embodiment, data sources use time to control the insertion of data into the network (thus, they are a chronological service). In addition, the services do not need any form of external control, and thus are autonomous from all other services, making them Autonomous Chronological Services. |
| Over Provisioning | Collisions in a probabilistic environment occur randomly. The probability of a collision increases as the utilization of the network increases. Therefore, reduction in collision probability can be achieved by limiting the network utilization to a small portion of the available bandwidth. This underutilization of the network is known as over provisioning since the network is provisioned to be many times (4-10 time) greater than what it will be used for. |
| Service Footprint | A service requires a certain amount of network resources to support it. Primarily a service requires a certain amount of bandwidth from source to sink. However, a service footprint is more than just bandwidth requirements. It includes number and size of packets as well as the maximum number of packets that could be transmitted at one time (burst). |
| Transmission Burst | When data is transmitted in a PSN, the data source first puts the data into a packet. Packets have a limited size (1500 bytes in an Ethernet environment). However, if the data is greater than the maximum packet size, the data must be spread across multiple packets. A source may transmit all of these packets at once, and these appear on the network as a continuous stream of packets. A service that transmits a large burst has a larger service footprint than one that uses a smaller burst, even if they use the same overall bandwidth. |
| Common Time Interval (CTI) | A unit of time agreed upon by all systems within a communications environment that will be using the described technology for deterministic communications. Services insert their data into the network at the same time offset within the CTI, allowing other services to detect them and avoid colliding with the established services. The CTI is shown in FIG. 2. |
| Time Offset | Services using the present embodiment transmit their time at an offset within a common time interval. The offset is a continuous time value and not limited to pre-determined time slices (time slots). The minimum time quantum of the offset is limited to the time capability of the transmitting system and the minimum time it takes to transmit a single item (typically a byte) on the network interface. |
| CDAT | Collision Detection and Avoidance Technology is the technology described in the present embodiment. |

The present embodiment is now described more fully hereinafter with reference to the accompanying drawings and definitions. During the description, a communications system configuration description is presented for illustrative purposes only. Any computer configuration and architecture satisfying the speed and interface requirements herein described may be suitable for implementing the system and method of the present embodiment.

In the system and methods of the present embodiment, all data transmission applications and services (hereafter called "Service") transmit their data during their determined time offset within a "Common Time Interval" (CTI). The CTI is a small (for example, 10 milliseconds) unit of time used for managing services and allowing the detection and avoidance methods to execute (see FIG. 2). The CTI is selected and used network-wide for all elements participating in communications according to the system and methods of the present embodiment. Each data source can synchronize to the CTI using one of a plurality of different timing mechanisms, for example, but not limited to, Building Integrated Timing System (BITS), time derived from the Global Position System (GPS), network-based synchronization systems, Stratum-3 or better clock system, or similar synchronization systems. How the endpoints use the selected synchronization method to establish internal timing is beyond the scope of this document. However, we assume accurate timing is available to the different systems participating in the communications environment to keep the interval timing consistent for the life of the communications.

In addition to a synchronization method at each endpoint, we also assume the underlying communications network allows some level of prioritization for the forwarding of the packet traffic. Traditional network systems assign priorities based on traffic type and use priorities in an attempt to lower impairment probabilities. For example, all traffic of one type (e.g. video) may have a lower priority than all of the traffic of another type (e.g. voice). As more and different traffic types require prioritization, more priority levels are required. The current embodiment described here changes the way priorities are used in the network. Prioritization is used to manage Service preemption and network collision detection and mitigation, not prioritization of traffic type in an attempt to manage impairment probabilities.

While Services on a non-prioritized network can benefit from the current embodiment, the most communications benefit is obtained with a network that supports at least three priority levels. With three priority levels, the lowest level would be used by standard, best-effort traffic. The next higher priority level would be used for collision mitigation and Service management. The highest priority level would be reserved for Service bearer traffic. Adding priority levels allows Service traffic that can preempt other Services. Preemption will be described in more detail later in the document.

The Service transmission can be in one of a plurality of different transmission states (See FIG. 4), for example, but not limited to, service setup (state 1), service time offset detection and avoidance testing (state 2), service transmission (state 3), collision or network alteration detection (state 4), collision or alteration mitigation (state 5), and service termination (state 6). These states will be used to help describe the actions and methods of Services to establish and maintain perfect communications.

State 1 is entered when the Service is initiated, and is used to validate the end-to-end connection and establish service parameters. State 2 is the state used to detect other services within the environment and to avoid those services to minimize service disruption. State 3 is the state in which most of the service data are transmitted. Data is transmitted and the transmitter enters State 4 to receive the statistics on its transmissions. If the statistics indicate no collision or network alteration was detected, the system reverts back to State 3 to continue transmitting. If a collision or alteration was detected, the transmitter enters State 5 in an attempt to mitigate the issues detected. State 5 is used to adjust the transmission offset to remove the detected network affect. State 6 is entered from State 3 as the service completes, allowing the network to recover the used resources. State 6 may also be entered from State 5 if the service determines it was preempted and no network resources are currently available for this service to continue transmitting.

The Service receiver (or data sink) can be in one of a plurality of different reception states (see FIG. 5), for example, but not limited to, service setup (State 1), data reception (State 3), statistical reporting (State 3), and reception terminated (State 4).

Both the source and sink enter their respective States 1 when they are establishing the service. Service setup implies a connection-oriented communications system between the source and sink. A connection is important, since the sink must report statistics back to the source, so the source can detect and mitigate effects from network reconfigurations and service preemption. Examples of connections in a network environment are: a connection to a file server to download a file, a connection between two users for a voice over IP phone call, a connection to a movie web site (such as Netflix) in order to watch a movie, and so on. All of these are examples of services that would benefit from the technology described herein.

Once the service has been established via the connection setup, both the transmitter and receiver enter their respective States 2. The source transmits its packets at the detection and avoidance priority level (which is lower than or equal to the normal Service transmission priority level). The data sink (receiver) receives the packets and time stamps each packet. It also performs some minor statistical calculations one the packets (such as inter-packet timing). The receiver enters its State 3 to report the statistics and then reverts back to State 2 in order to receive more data.

Consulting FIG. 1, endpoint A (data source) has established a connection to endpoint D (data sink). Both endpoints agree on a Common Time Interval (CTI) as depicted in FIG. 2A. Both endpoints enter State 2, and endpoint A randomly selects an offset and starts transmitting using that offset (FIG. 2B). For this example, the CTI is 10 milliseconds and endpoint A is transmitting 4 packets of 1250 bytes each, for a total of 4×1250×100×8=4 megabits of data per second (for example, endpoint A could be streaming a video to endpoint D). Endpoint D receives the packets, performs its statistical analysis, and reports the results back to A. Endpoint A analyzes the statistics, does not detect any collisions, and therefore it selects the offset as the one it will use for this service. Endpoint A now enters its State 3, where it sets its transmission priority to the Service priority and transmits its data. Endpoint D continues to receive data, calculates statistics, and reports the results back to Endpoint A. Unless the network experiences an outage, or a new service preempts the service between A and D, this service will continue until all data has been transmitted or one of the endpoints terminates the service. Note that this service was established completely autonomously from the rest of the network. Neither any other endpoint nor any of the switches and routers was informed of the service being established. This Service is known as an Autonomous Chronological Service (ACS) since while it is autonomous, it requires timing to manage its packet transmissions.

Figure 3:
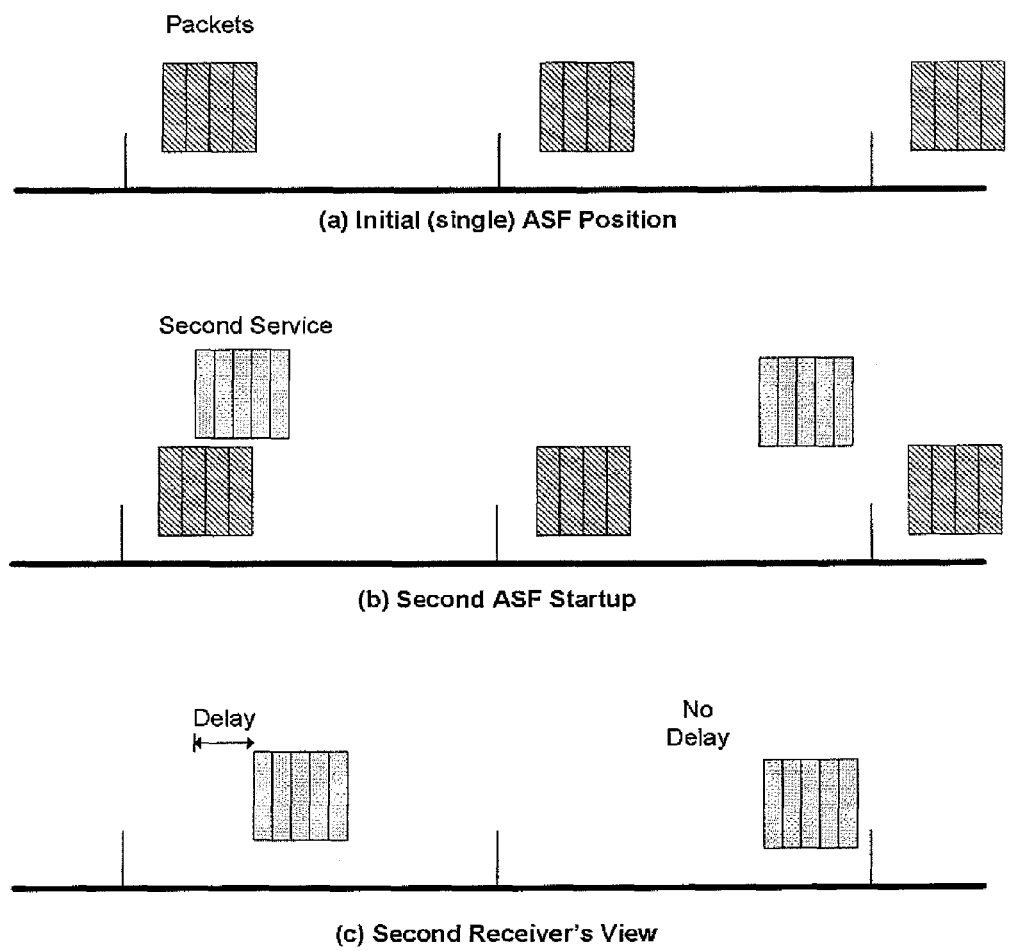
FIG. 3 shows the network environment when a second Autonomous Chronological Service (ACS) starts to transmit.
Figure 6B:
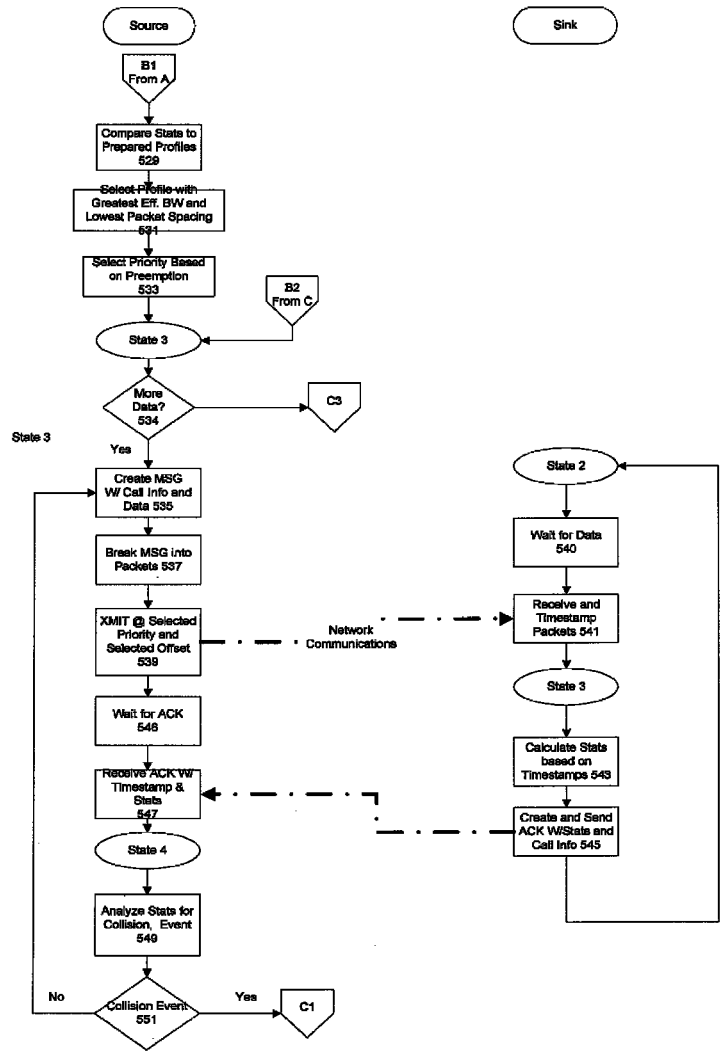
Figure 6C:
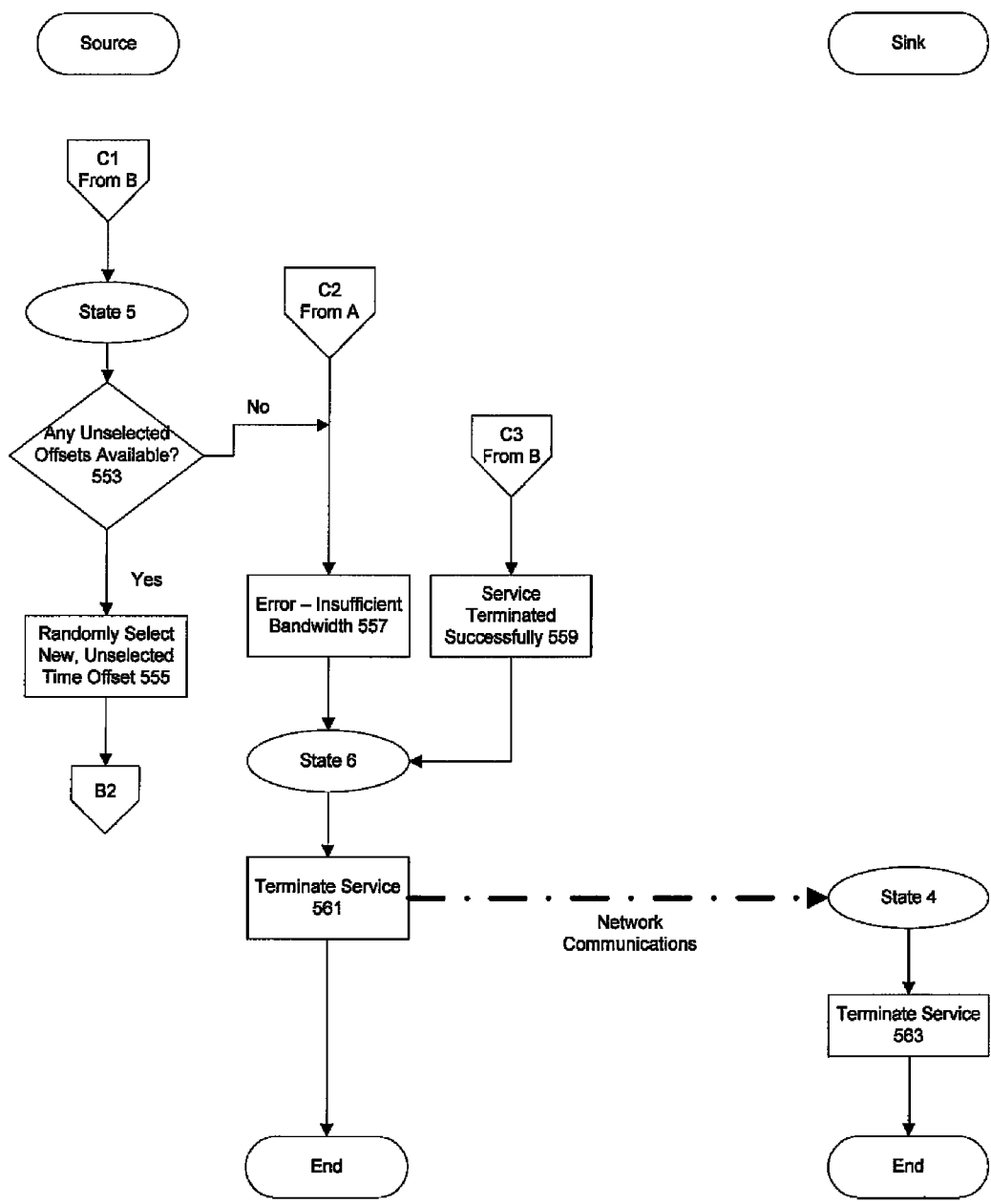

Now we consider the situation when a second service, one between endpoints C and B, starts up while the first service is still operational. Since both services will traverse the same link between S/R 12 and S/R 13 (FIG. 1), there may be contention on using that link. FIG. 3A shows the link prior to the setup of the second service, with the traffic from the first ACS traversing the link unimpaired. The second service, during its State 2, picks a random offset as shown in the first CTI of FIG. 3B. Note that this offset happens to overlap the transmission of first ACS. As we see in the first CTI of FIG. 3C, the packets of ACS 2 are delayed because of the collision with ACS 1. Therefore, endpoint C randomly picks a new offset and transmits its data on that offset (the second CTI of FIG. 3B). Since this transmission does not collide with ACS 1, this offset is selected by endpoint C as its transmission offset. Both services can transmit and experience perfect service quality, since once established they will not collide with each other. Many services could use this technique to establish their offset, and once established, all services would use the network unimpeded.

The system and method of the present embodiment can allow the use of multiple service preemption priorities. A high preemption priority service can use a different, higher forwarding priority than the standard service. The higher preemption priority service can also use the same plurality of states as outlined previously for the normal priority service. However, since the higher preemption priority service can use a higher forwarding priority, its transmissions could disrupt the lower preemption priority services. This disruption is detected through statistical analysis in State 4. The lower preemption priority service can then attempt to mitigate the disruption by entering State 5. It may find that there is no longer space available in the network for this service, in which case, the lower priority service can terminate with, for example, an "overridden" error by entering State 6.

Figure 7:
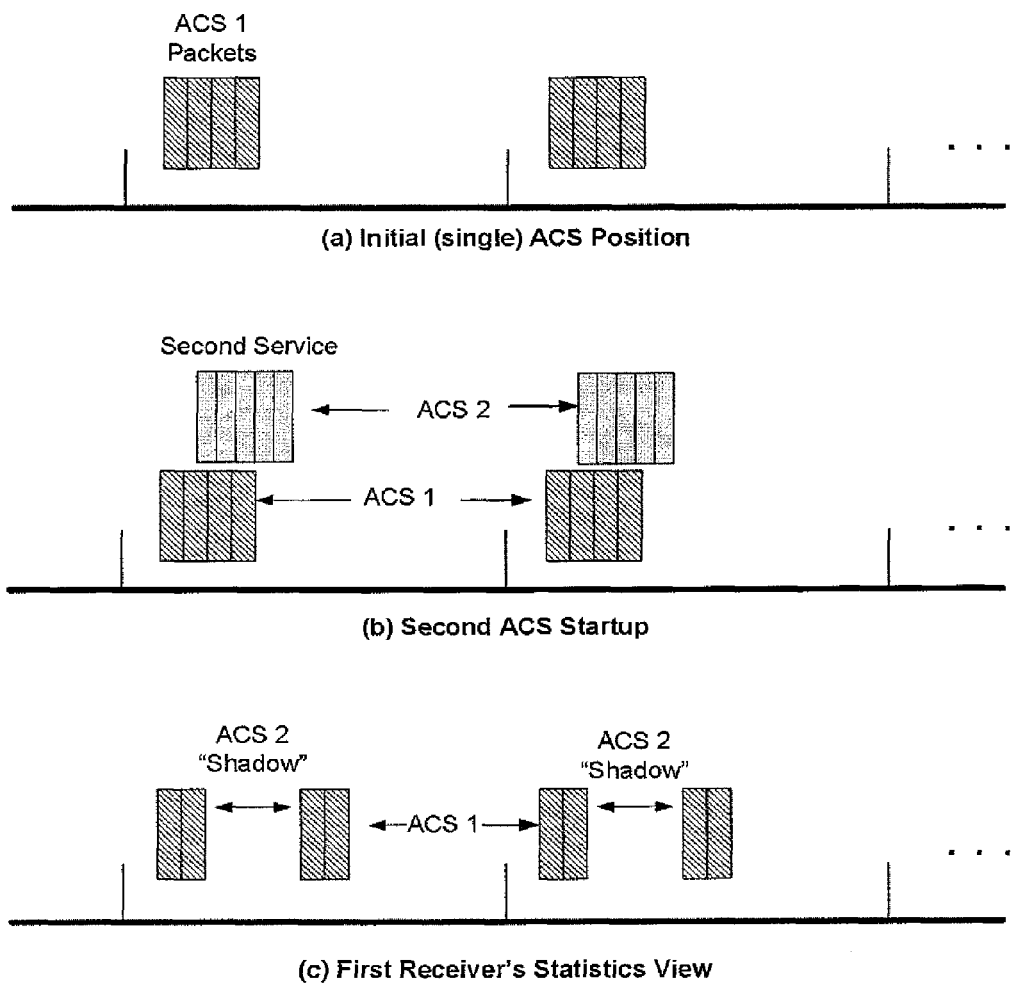
FIG. 7 shows the timing of a new ACS preempting an existing ACS.

As an example, consider the case where a service is established between endpoints A and D and the service is transmitting as described before (FIG. 7A). However, when the second service (between C and B) starts up, it is a higher priority, preemption service. As last time, a random offset is selected for the service transmission, and again the services collide. However, unlike the previous situation, this new service's (ACS 2) packets are at a higher priority (preemption priority) than the normal service's (ACS 1) packets. Therefore, ACS 2 is not aware of the ACS 1's packets. However, ACS 1 experiences a collision, which results in a gap in the received packets timing (FIG. 7C). This gap is known as a shadow and the shadow indicates a preemption service has collided with ACS 1. (Note that there are other indicators of preemption besides the shadow identified here.) Since ACS 1 was preempted, it must pick a new time offset for its transmissions. Therefore, endpoint A enters State 5 (from FIG. 4) and attempts to mitigate the effects of the preemption. It picks new offsets attempt to find an offset that is not used by either the preemption service or other normal services. If an offset can be found that has no collisions, then that offset can be used. Otherwise, ACS 1 must indicate that it was preempted by entering State 6.

There can be any number of service preemption priority levels as long as there are enough different forwarding priority levels within the network equipment. The network equipment must support N+2 priority levels, where N is the number of different service preemption priority levels (note that for a single service priority level, with no preemption, N=1). These service preemption priorities can be used to differentiate the service levels, not service types. For example, there could be a large number of video service types all sharing the same service preemption priority level. There could also be the same video service types at a higher preemption priority level because they have special meaning (for example, these videos could be from a source that detects an intrusion event in a security environment). Service preemption priority becomes a policy decision, not a networking technology decision. There is not a technological reason for assigning services different preemption priority levels according to the present embodiment. Thus, the system and method of the present embodiment can support all service types on a single preemption priority level, which would also use a single forwarding priority level.

Each service source can support a low-drift timing system that will drift less than, for example, $3.7 \times 10^{-7}$ in twenty-four hours. The timing source can be, for example, a Stratum-3 clock source or, if the system is not expected to require timing holdover (it will always be connected to a timing source) it can use, for example, a Stratum-4 clock system. The clock controls the timing of the transmissions, and measures out the Common Time Interval (e.g. 10 ms). The service source uses the clock for performing transmissions. The service destination can use the clock for statistics of the received packets. The more accurate and stable the clock, the more accurate and stable the transmissions and receptions, increasing the utilization of the network by services operating according to the system and method of the present embodiment.

Services have transmission sources and transmission destinations. A service source randomly selects a time within the 10 ms interval to transmit data. The transmission start time can be chosen so that transmission of this service will not interfere with transmission of any other service from the device. The transmission start time can be used for State 1 in which the source creates a message that contains, for example, but not limited to, the following information: service type, service identification, message identification, call size, call minimum, time stamp, time interval, service specific information, and padding. The service type is a service specific identifier that allows the receiving device at the destination to interpret and direct the received packets to the correct application. The service identification is a locally generated value that allows managing of the service between the source and the destination. The message identification is a value for the message, for example, but not limited to, a uniformly increasing value, that can be used for example, for message tracking. The call size is the maximum number of bytes that are transmitted in each 10 ms interval. The call minimum is the minimum number of bytes that can be transmitted in each 10 ms interval. The time stamp is the time derived from the local clock source; the time interval for this service is the time, in, for example nanoseconds, that specify the global time interval, for example, 10 ms or 10,000,000 nanoseconds. The service specific information is any information that is needed by the service to allow the service to be set up correctly. The padding is enough extra data to set the message size equal to the call size.

The message is broken up into packets that are roughly equal size. At least two packets are created and this group of packets is transmitted sequentially into the network. The transmission occurs at the call setup forwarding priority level. The receiving device calculates a timestamp recording the reception of each packet. These timestamps can be used to perform the analysis of the data reception. The receiving device can create an acknowledgement packet that can contain, for example, but not limited to, service type, service identification, message identification, packet identification, packet size, and time stamp for each received packet. The first packet in the message can be, for example, but not limited to, identification 0, the second can be identification 1, and so on. The packet size is the size of the received packet in bits. The time stamp is the time when the packet was fully received. If an error (e.g. a CRC error) causes a packet reception to be terminated, that error is indicated in the acknowledgement message. The acknowledgement message is sent to the source which can use the time stamp to calculate, for example, but not limited to, effective bandwidth, minimum, maximum, and average inter-packet time (using differences between all of the time stamps), and added traversal spacing (equal to the time it takes a packet to be transmitted from source to destination minus the time is should take calculated using packet size and bandwidth). The destination can record the minimum, maximum, and average added spacing. The source can send more test messages of the same size and packet profile as this first test message, for example, but not limited to, seven test messages. The destination can record and report the statistics, and the source can analyze and record the statistics and create a profile of that time slice based on these statistics. If the effective bandwidth is less than the service size, the service cannot be established. An error indication can be created to indicate the service problem and the service can terminate by entering state 6.

The source can start sending service data, continuing to transmit at the call setup priority level. The destination can receive and record the service data and the service data statistics, and report those statistics back to the source every interval. Alternatively, the destination can accumulate the statistics and transmit the results periodically, for example, but not limited to, once every four intervals. The accumulation of statistics between transmissions can reduce the amount of traffic on the return path.

The source can select a different time offset for the transmission of service data. The source can transmit in that offset for a number of transmission cycles, for example, four transmission cycles, accumulating statistics for that time offset. After several cycles, the source can select a different time offset and transmits in that offset for several cycles. The source can perform this probing of offsets over for several different time offsets, for example, eight, and then compare profiles for each offset. The source can use profile analysis to select the best offset for the transmission. The analysis can look for, but not limited to, statistics that show greatest effective bandwidth, minimum delay, minimum inter-packet spacing, minimum jitter, and other data that could indicate collision and other interactions. The selected offset is used for normal transmissions.

The source can transit to State 3 for normal transmissions, and can transmit service data at the service priority level and using the selected time offset. The destination can continue to gather statistics and report the results to the source. The source can analyze the statistics looking for a collision event. A collision event can be declared if any of the following occur for more than a certain number, for example three, consecutive intervals or over a certain pre-selected threshold which can be determined by policy, but could be, for example, but not limited to, fifteen intervals in a one-second time frame or 150 intervals in a one-minute time frame: (1) if the effective bandwidth decreases by more than a certain amount, for example ten percent, or (2) if the added spacing average increases by more than a service-defined amount which can depend upon the number of hops, for example, but not limited to, three or four packet sizes, or (3) if the maximum added spacing increases by more than a service-defined amount which can depend on the number of hops, for example, six to ten packet sizes. If a collision event is declared, the service transits to State 5. In State 5 the source can send a message to the destination of the state transition and perform the State 5 mitigation. In state 5 the service can revert to transmitting at the call setup forwarding priority level and selects a new random time offset in an attempt to find a new, available offset. The service can select several different time offsets, for example, four, attempting to find one that is as good as or better than its previous offset (within service-defined bounds). If after several attempts, for example, four, the service finds one or more offsets that meet the requirements, it selects the best one and transitions back to State 3. If none of these attempts meets the requirements, the service will continue to cycle into state 5 for more attempts. If during these attempts, the service finds the effective bandwidth is less than the service size, it will transit into State 6 with an out-of-bandwidth error. The service can remain in state 5 for a number of attempts defined by policy and service type, for example, but not limited to, three attempts. If, after exhausting all of the attempts, the service is unable to find a suitable time, but it does find at least a certain number, for example, two, with similar characteristics, the service can assume a network failover has occurred to a lower bandwidth path and can pick the best time slot, generate an error indicating the lower-bandwidth transmission, and transition to state 3. If the system detects another collision event after detecting the lower-bandwidth transition in State 5, the system can determine that there is too much traffic on the network and determine the policy for action, for example, to terminate the service.

FIG. 8 depicts a sample communications environment used for a sample service. The Source System 100 provides the data being sources into the network. The network is represented by Switch/Router 101 and 102. The destination of the service is Sink System 103. Source System 100 can be any form of computer or electronic device that can connect to the packet based network, transmit packets into the network using the techniques and algorithms of the present embodiment, receive statistics from Sink System 103, and use those statistics and apply algorithms to detect and mitigate collisions. Sink System 103 can be any form of computer or electronic device that can connect to the packet based network, receive packets from the network, perform the time stamping and statistical algorithms of the present embodiment, and report statistics to the Source System 100. Switch/Router Systems 101 and 102 represent any network forwarding element that implements the functions of a packet switched network element and can provide at least two and preferable more levels of prioritization. Note that the network elements do not need to provide other forwarding features, such as label switch (for example MPLS), traffic shaping, resource reservation, and other QoS features.

Data Source system (100) must implement a number of functions in order to provide the capabilities described in the present embodiment. An example of an architecture to implement these functions is given in FIG. 9. Other architectures or expansions of this sample architecture may also be used to provide the capabilities of communications described herein with this present embodiment. The functions identified in FIG. 8 can be implemented in hardware, software, firmware, or some combination of these elements and include Time Management System (200), CDAT Protocol System (201), Packet Control System (202), Error Management (203), CDAT Analysis (204), and CDAT Mitigation System (205). These functions must exchange data and control information, as shown in FIG. 9, which will be described below.

Referring primarily to FIG. 9, the various functions and data exchanges will now be described. The Timing Management System (200) controls and manages timing for the system. The Timing Management System receives timing information from an external source via the External Time Source (216) communications channel. This timing information may come from one or more sources, including, but not limited to, internal time card that meets Stratum 3 or better capability, external timing from a BITS source, timing extraction from a GPS receiver system, synchronization over the network via a network-based timing system, or other similar reference timing. The Timing Management System provides two different types of time management for the system. It provides Transmission Timing Control (212) for controlling when packets are transmitted within a Common Timing Interval. The Timing Management System also provides time stamping functionality via the Time Stamp Interface (213). Each packet that is transmitted using the current system gets time stamps to support statistical analysis. If the Timing Management System detects an error (for example, the timing source becomes unavailable), the error is reported to the Error Management (203) function via the Error Information (221) channel.

The CDAT Protocol System (201) is the system that manages the protocol used to implement the present embodiment. It is also the system that manages the system states as identified in FIG. 4. A protocol defines how to interpret messages and what actions to take based on events associated with the service communications. The protocol defines the information that must be transferred from the source to the sink in addition to the service's data traffic. The information includes, but not limited to, time stamp information, packet identification, service identification, and error information (if any). The CDAT Protocol System also receives information back from the Sink system (block 103 of FIG. 7) that includes (but not limited to) received packet time stamps and statistical information. It is the flow of packets out to the destination, the packets received from the Sink, and the analysis and mitigation information that controls the States and State transitions of the system.

The CDAT Protocol System receives time stamp information from the Time Stamp Interface (213) and uses that information in its protocol management, including defining message headers. The CDAT Protocol System provides Header and Message Control (214) to the Packet Control System (202), allowing it to correctly formulate messages that it will transmit. The header and message control information includes (but not limited to) time stamp information, packet identification, service identification, and other similar information. The CDAT Protocol System receives the messages from the Sink System using the Acknowledgement and Error Processing (217) channel from the Packet Control System. The protocol system extracts timing and statistical information that is passed to the CDAT Analysis (204) function via the Statistical information (218) channel). Other protocol based information is used to update the protocol. If the Sink system or the Packet Control System detected errors, this information is passed to the CDAT Protocol System, which extracts the error information and reports the errors to the Error Management (203) function via the Error information (215) channel. If the error has been processed and repaired, the Error Management function reports the recovery via the Recovery and Restoration (220) channel. The recovery and restoration information may affect the protocol generation and interpretation, as well as analysis and other functions of the system. The CDAT Protocol System exchanges information with the CDAT Mitigation System (205) over the Event Mitigation Control (219) channel. If an event, such as preemption or network reconfiguration, occurs, the system must adjust to the new situation (typically by adjusting the transmission offset). This mitigation effort may change the protocol data and the interpretation of returned protocol information.

The Packet Control System (202) can provide message formation, message packetization, protocol insertion, and packet transmission to Data Service Communications (211) and Network Communications (211). Packet Control System receives message header and message control information from the CDAT Protocol System (201) over the Header and Message Control (214) channel. Timing control is received from the Timing Management System (200) on the Transmission Timing Control (212) channel. Those packets associated with a service and that require timing are delayed until the proper offset within the Common Timing Interval. When the proper offset arrives, the delayed packets are transmitted onto the Data Service Communications (211) channel. There may be other, non-timed communications controlled by the Packet Control System. Those non-timed packets do not need to wait for a particular time offset and they are transmitted on the Network Communications (210) channel.

Note that the Data Service Communications and Network Communications channels may (and most likely) use the same physical interface to connect to the network. Therefore, packets that are to be transmitted on the Packet Control System may be delayed so as not to interfere with timed packets about to be transmitted on the Data Service Communications channel. For example, consider the situation where the system is transmitting service data at time offset 4 milliseconds. Also, consider the sample system is using a 100 megabit per second Ethernet link to connect to the network. In addition, the system used as an example has a 10,000 bit (1,250 byte) packet to transmit on the Network Communications channel. That packet would take 100 microseconds to transmit into the network. Therefore, if the packet was to be transmitted anywhere between offset 3.9 to offset 4.0, it would still be transmitting when the timed service was to be transmitted. The timed service would be delayed due to the non-timed transmission. Therefore, the non-timed packet would need to delay until after the timed transmission so that the non-timed transmission would not interfere with the timed service.

The Packet Control system receives data from the Sink System (103 of FIG. 8) and sends that information to the CDAT Protocol System (201) via the Acknowledgement and Error Processing (217) channel. Not shown in the architecture given in FIG. 9 is a connection to the computer application generating the service data. While the application is the source of the service data, it is beyond the scope of this document and in general, it is not a factor in how the system performs its collision detection and avoidance. However, if the application has a large variation in its data transmission rates, the Packet Control System must insert padding traffic into the network to maintain its offset position in the network. For example, if the application did not have any traffic for a large number (for example, 8) of Common Timing Intervals, another autonomous service could attempt to use that offset, and would not detect any collisions in that offset. Then, when the application again had data, a collision would occur when that data was transmitted. Therefore, the Packet Control System must add padding to the service (packets that contain null or non-service data) to ensure that other services can detect and avoid this service. Note however, that the Packet Control System does not need to every interval, just roughly 50% of the intervals (every other interval). The detection algorithms will still be able to detect and avoid a potential collision even if the offset is used only 50% of the time.

Errors, unanticipated and unusual events can and do happen in communications systems. Handling errors, events, and notifications is the responsibility of the Error Management (203) function. It receives error, event and notification information from the Timing Management System (200), CDAT Protocol System (201), and CDAT Mitigation System (205) on their Error Information channels (items 221, 215, and 222 respectively). As errors are processed, they can be recorded to an Error Logging Service (224). As errors are processed and handled, the information on the error recovery is reported back to the CDAT Protocol System using the Recovery and Restoration (220) channel. In addition, recovery information may be received from the network by the CDAT Protocol System (301). In that case, the recovery information is reported to the Error Management function using the same Recovery and Restoration (220) channel.

CDAT Analysis (204) function can receive statistical information on the Statistical Information (218) channel from the CDAT Protocol System. The CDAT Analysis function reviews the statistical information looking for communications events, such as (but not limited to) preemption, timing drift, network reconfiguration, or other communications events. A packet based communications network is inherently jittery—that is two identically sized packets traversing the identical path may take slightly different times to traverse that path through the network. Some filtering may be required to remove the random variations in timing that occurs on the network. Therefore, the CDAT Analysis function requires multiple statistics to extract the underlying information on the state of the communications. In addition, different types of collisions manifest themselves differently and often the affect changes over time and that time changing nature can help identify the type of collision. The CDAT Analysis function then looks for patterns in the received statistics as well as changes to the patterns to determine what interactions, collisions, and events are occurring in the network.

The different statistical patterns allow the system to detect the following collisions (but is not limited to just detecting these collisions): Multiple service establishments during service setup, preemption by a higher preemption level service, drifting by a service whose clock is no longer exactly synchronized to the Common timing Interval, network reconfiguration onto the path used by this service, network reconfiguration onto a different path from the one that this service was using, fully utilized paths, insufficient bandwidth paths, effective available path bandwidth, Services that only use the network for a portion of the time (that is, only use 50% of the Common Time Intervals) and other such interactions and collisions. In addition, the analysis can reveal if the clock from the Timing Management System (200) is drifting in relationship to the Common Timing Interval, which may cause the data from this ACS to collide with other ACS data flows within the network. These collisions and interactions are reported to the CDAT Mitigation System (205) via the Event Detection information (223) channel.

The CDAT Mitigation System (205) receives event and collision information from the CDAT Analysis (204) via the Event Detection Information (223) channel. Mitigation (205) uses information from the analysis that identifies the type of collision or event to determine what the system needs to do to mitigate and repair the collision or event. Mitigation (205) reviews the information it has about the services currently using the path from the source to the sink and it reviews what time offsets are currently occupied. Mitigation (205) then selects a new offset and informs the CDAT Protocol System (201) about the change in offset. As new offsets are used, new statistics related to those new offsets will be received and analyzed by the CDAT Analysis (204) function. The analysis may indicate the new offset does not have any collisions, in which case the new offset can be used by the service. However, it may turn out that no offset can be found that results in no collisions. In that case, the service must be terminated, and the no available offset error is sent to the Error Management (203) function via the Error Information (222) channel.

The Data Sink (item 103 in FIG. 8) system mirrors the Data Source (item 100 in FIG. 8) system, but is simpler in concept than the Source system. Data Sink system (103) must implement a number of functions in order to provide the capabilities described in the present embodiment. An example of an architecture to implement these functions is given in FIG. 10. Other architectures or expansions of this sample architecture may also be used to provide the capabilities of communications described herein with this present embodiment. The functions identified in FIG. 10 can be implemented in hardware, software, firmware, or some combination of these elements and include Time Management System (300), CDAT Protocol System (301), Packet Control System (302), Error Management (303), CDAT Analysis (304), and CDAT Mitigation System (305). These functions must exchange data and control information, as shown in FIG. 10, which will be described below.

Referring primarily to FIG. 10, the various functions and data exchanged of the Data Source system will now be described below.

Unlike the Data Source (100 of FIG. 8) system, the Data Sink (103 of FIG. 7) system does not need to transmit at specific offsets within the Common Timing Interval. Therefore, the Timing Management System (300) is used to provide time stamping to the Packet Control System (302) via the Time Stamp interface (313) and interval timing to the CDAT Protocol System (301) via the Time Interval Control System (312). The Timing Management System (300) receives timing information from an external source via the External Time Source (316) communications channel. This timing information may come from one or more sources, including, but not limited to, internal time card that meets Stratum 3 or better capability, external timing from a BITS source, timing extraction from a GPS receiver system, synchronization over the network via a network-based timing system, or other similar reference timing.

The CDAT Protocol System (301) is the systeni that manages the protocol used to implement the present embodiment. It is also the system that manages the system states as identified in FIG. 5. The protocol defines the information that must be transferred from the Sink system to the Source system in addition to the service's data traffic. The information includes, but not limited to, time stamp information, packet identification, service identification, and error information (if any). The CDAT Protocol System also receives information from the Source system (block 100 of FIG. 8) that includes (but not limited to) transmit packet time stamps and service control information. It is the flow of packets from the source and the statistical analysis that controls the states and state transitions of the system as shown in FIG. 5.

The CDAT Protocol System (301) receives protocol data from the Packet Control System via the Protocol Removal and interpretation (317*a*) channel. It sends the packet information (including time stamps) to the CDAT Analysis (304) via the Statistical Information (318) channel. After Analysis (304) performs its statistical calculations, it returns the information to the CDAT Protocol system via the same Statistical Information (318) channel. Protocol (301) creates an acknowledgement packet that includes the error (if any) and packet reception information and sends it back to the Packet Control System (302) via the Acknowledgement Processing (317*b*) channel. The Statistical and time stamp information is combined with Service protocol information and sent to the Packet Control System via the Header and Packet Evaluation (314) channel. Note that an Acknowledgement should be returned after each Common Timing Interval's worth of service data is received. However, the statistics and time stamp information has the option of being accumulated and sent back only periodically (for example, after every 3 or 4 intervals), which would reduce the amount of traffic on the network.

Protocol (301) sends information about service setup and termination to the CDAT Mitigation System (305) via the Service Setup and Termination (319*b*) channel, and receives information about changing service offsets from the CDAT Mitigation System via the Event Reporting (319*a*) channel. While the receiver does not perform any mitigation acts, these communications allow Protocol (301) to properly maintain its service state and to also ensure the Source maintains its own state information as well.

The Packet Control System (302) receives service data from the Source System (100 of FIG. 8) timestamps each packet as it arrives. Packet (302) also transmits acknowledgements, statistical information, and other protocol or service data to the Source. These communications use the Data Service Communications (311) channel. Other, non-service oriented communications uses the Network Communications (310) channel. Note that Data (311) and Network (310) may (and usually will) share the same physical network interface.

Errors, unanticipated events, and unusual notifications can and do happen in communications systems. Handling errors, events, and notifications is the responsibility of the Error Management (303) function. It receives error, event, and notification information from the Timing Management System (300), CDAT Protocol System (301), and CDAT Mitigation System (305) on their Error Information channels (items 321, 315, and 322 respectively). As errors are processed, they can be recorded to an Error Logging Service (324). As errors are processed and handled, the information on the error recovery is reported back to the CDAT Protocol System using the Recovery and Restoration (320) channel. In addition, recovery information may be received from the network by the CDAT Protocol System (301). In that case, the recovery information is reported to the Error Management function using the same Recovery and Restoration (320) channel.

CDAT Analysis (304) performs statistical calculations on the received service packets. These statistics include, but not limited to, packet receive timestamps, inter-packet timing (the time difference between each packet received within the current interval), total accumulation time (the difference in time from when the first packet arrived and the last packet arrived within the current interval), and inter-interval timing (the time difference between the arrival of the first packet in the previous interval and the first packet in the current interval. In addition, Analysis (304) looks for other indicators of collision or network reconfiguration, such as, but not limited to, missing packets, out-of-order packets, duplicate packets, and packets delayed longer than a single Common Timing Interval. These last items are considered events and are reported to the CDAT Mitigation System (305) via the Event Detection Information (323) channel.

On the Sink side, the CDAT Mitigation System (305) only detects that a collision, network reconfiguration, or other event has occurred and the source must be made aware of the event. State information (primarily service start and termination) is received from Protocol (301) via the Service Setup and Termination (319b) channel. Event reporting (that is, events that must be reported to the Data Source) is sent to Protocol (301) via the Event Reporting (319a) channel. Mitigation (305) receives information about events from Analysis (304) via the Event Detection Information (323) channel. If Mitigation (305) detects an erroneous or unanticipated event (such as loss of data or unexpected termination of the service), the error is sent to the Error Management (303) system via the Error Information (322) channel.

Referring to items in FIG. 8, FIG. 9, and FIG. 10 the overall methods of the systems will be reviewed and described from a high level. The Source System (100) is attempting to send data to the Sink System (103) across a packet switched network (PSN) and will use the methods depicted in FIG. 9. The normal PSN environments are probabilistic in nature. However, using the described systems and methods, the Source and Sink systems will communicate in a deterministic manner. Determinism is achieved by the Source system first using the methods of the Timing System (200) to define a Common Timing Interval; Second using Timing (200) methods to control when the Packet System (202) will transmit its packets into the network by third, using Timing (200) methods to select an offset from a plurality of all available offsets within a Common Timing Interval. Fourth, using Protocol (201) methods to select a priority for the packets based on preemption level (and not based on packet type, service type, or other, non-deterministic priority criteria). Fifth, using Protocol (201) methods to provide information needed in the analysis of received packets at the Sink System. And sixth, analyzing returned statistics using Analysis (204) methods to detect a collision or other event. The information provided by Protocol (201) methods can include, but is not limited to including, service type, service identification, message identification, maximum number of bytes transmitted in each interval, minimum number of bytes transmitted in each interval, time stamp, time interval for the service, for example, service information, and padding to equal maximum number of bytes. Protocol (201) method may also break the data packets into multiple packets of substantially the same size, with at least two packets created for transmission during each transmission cycle (interval). The Packet System (202) will transmit this plurality of packets into the network sequentially.

The Source will continue to transmit at its determined offset, allowing other services to detect and avoid this service, thus eliminating collisions and the associated impairments in the network. However, network reconfigurations and service preemption may cause the status of the service to change. This changing status is detected by Analysis (204) methods and adjustments are made to the service by Mitigation (205) methods that will restore the service back to its deterministic and unimpaired state.

The Sink System (103) uses its methods identified in FIG. 10 during reception of service data. The Timing (300) methods are used to define the Common Timing Interval at the receiver, and to timestamp incoming packets. The Packet Control (302) methods receive the incoming packets and timestamps them, sending the packets and timestamp information to the Protocol System (301) methods for protocol extraction. The timestamp and packet control information is sent to the Analysis (304) methods in order to have a variety of statistics about the received packets created. This statistical information is sent back to the Source as an acknowledgement and statistical information, so the Source can monitor the transmission and detect events, reconfigurations, and preemptions. The acknowledgement messages can include, but are not limited to including, minimum/maximum/average inter-packet time, added spacing (calculated using the actual transmission time of the packets minus the expected packet transmission time, that is, the time the packets should take based on path bandwidth), changes to received offset (that is changes in received delay) and other such statistics. The Sink Mitigation (305) system performs additional mitigation analysis by evaluating the statistics to determine if the source should perform a mitigation effort. The combination of the Sink and Source performing mitigation determination will minimize the time between when an event occurs and when the system mitigates the effects of that event.

The Source and Sink combine to determine the proper transmission offset through the methods of this embodiment. The Source Methods include selecting an offset from all available offsets, creating a set of packets from the service data and protocol data, transmitting the set of packets starting at the offset and continuing until the complete set of packets has been transmitted, receiving statistical information about the reception of those packets, evaluating the statistics against a plurality of possible reconfiguration, collision, preemption, or other events to detect the absence or presence of one or more events, and if one or more events is detect, to use further methods to mitigate the effects of the events by selecting and trying other offsets until either an offset is found that provides unimpeded communications, or all offsets were evaluated, and no offset could be found, indicating the network is saturated.

The Sink system provided a further method of the present embodiment for receiving packets that convert a probabilistic, packet-based communications system into a deterministic communications system can include, but is not limited to including, the steps of time stamping a received packet; evaluating received packets to create statistics concerning the packet reception, creating an acknowledgement packet including, but not limited to, service type, service identification, message identification, packet identification, packet size, packet time stamp, and packet statistics for each packet and for the block of packets received each interval, recording and reporting information; calculating and storing statistics; creating a profile of a time slice of packet reception based on the statistics; sending an error indication if a service cannot be established based on effective bandwidth and service size; receiving and recording service data and statistics; sending statistics at pre-selected intervals.

An embodiment of the information transmission system of these teachings is shown in FIG. 12. Referring to FIG. 12, the embodiment shown therein includes a time selection component 637, a transceiver component 634, the transceiver component including a transmitter subcomponent and a receiver subcomponent. The transmitter subcomponent is meeting a predetermined time within the predetermined time interval, the predetermined time being determined by the time selection component 637. The embodiment shown in FIG. 12 also includes a transmission report analysis component 640. The transmission report analysis component 640 analyzes information related to transmission statistics received by the receiver subcomponent of the transceiver 634. The transmission statistics are analyzed in order to ascertain whether transmission problems occurred. If transmission problems occurred, the transmission report analysis component 640 request another predetermined time for transmission from the time selection component 637.

An embodiment of the information receiving system of these teachings is shown in FIG. 13. Referring to FIG. 13, the embodiment shown therein includes a transceiver component 770, the transceiver component having a receiver subcomponent and a transmitter subcomponent. The receiver subcomponent receives information from a transmission system. The embodiment shown in FIG. 13 also includes a transmission statistic generation component 740; the transmission statistic generation component 740 gathers information related to transmission statistics for the received information. The gathered information is transmitted by the transmitter subcomponent of the transceiver 770

Continuing to refer primarily to FIG. 9, FIG. 10, and FIG. 11, the Source and Sink methods of the present embodiment can be, in whole or in part, implemented electronically. In one embodiment, such as that shown in FIG. 11, the transmitter system (100 from FIG. 8) or receiver system (103 from FIG. 8) can include one or more processors 810, and computer usable media 830 having computer readable code embodied therein capable of causing one or more processors 810 to implement the methods of this invention. The one or more processors 810, the computer usable media 830, and the other components are operatively connected by means of a connection component 815 (the connection component may be, for example, a computer bus). In addition, a transmitter system and a receiver system can coexist on a single platform consisting of one or more processors 810 and computer usable media 830. The coexisting system can be used for, but not limited to, bidirectional services, service expansion (the receiver receives the data from one service and then sends it to multiple sink systems), service gateway (the receiver receives data on one network and gives it to the source to transmit onto another network) and other uses.

Signals representing actions taken by elements of system 100 (FIG. 8, and methods shown in FIG. 9) can travel over electronic communications media. Control and data information can be electronically executed and stored on computer-readable media. System 100 (FIG. 8) can be implemented to execute on a node in a communications network (101-102) or via the Internet. Common forms of computer-readable media can include, but are not limited to, for example, a floppy disk, a flexible disk, a hard disk, magnetic tape, or any other magnetic medium, a CDROM or any other optical medium, punched cards, paper tape, or any other physical medium with patterns of holes or ink or characters, a RAM, a PROM, an EPROM, a FLASH-EPROM, or any other memory chip or cartridge, or any other medium from which a computer can read.

Although the teachings have been described with respect to various embodiments, it should be realized these teachings are also capable of a wide variety of further and other embodiments.

What is claimed is:

1. A method for transmitting information over a network in a deterministic fashion, the method comprising the steps of:
   a. determining the data to transmit during a predetermined interval and converting that data into a set of packets;
   b. selecting a time to transmit, the time being an offset selected within a predetermined time interval; a transmitting component transmitting the data being synchronized to the predetermined time interval using an external timing source; a receiver component receiving the data also synchronized to the external timing source; the accuracy of the external timing source selected in order to keep timing of the predetermined interval consistent for entire communication duration; transmission being in one of a number of predetermined states and transitioning to a next state from the number of predetermined state to establish and maintain communication; said next state not being known apriori from a previous state; said predetermined states comprise a state for service time offset detection and avoidance testing and a state for collision or network alteration detection;
   c. transmitting packet information over the network;
   d. receiving a transmission report from the receiver component; the transmission report comprising information related to transmission statistics;
   e. obtaining the transmission statistics;
   f. analyzing the transmission statistics in order to ascertain whether transmission problems occurred; the transmission problems comprising collisions, network reconfiguration, or preemption;
   g. selecting, if transmission problems occurred, another time to transmit; said another time being an unused and previously unselected offset selected within the predetermined time interval; and
   h. repeating, if transmission problems occurred, steps a) through g) until either the problems are eliminated or no unselected offsets remain.

2. The method of claim 1 wherein the step of receiving a transmission report comprises the step of receiving an acknowledgment and a timestamp for each one packet received; wherein the timestamp is indicative of a time at which said one packet was received.

3. The method of claim 1 wherein transmission comprises transmission of packets and wherein a priority is assigned to each packet.

4. The method of claim 3 wherein the priority is selected is based on communications service preemption level.

5. The method of claim 4 wherein packets are transmitted according to selected priority.

6. The method of claim 1 wherein the transmission statistics determine an effective path bandwidth and received packet spacing.

7. The method of claim 3 wherein the step of selecting said another time to transmit comprises the steps of:
  a. selecting a plurality of time offsets from all available unused and previously unselected offsets within the predetermined time interval;
  b. transmitting a plurality of data messages using these various time offsets;
  c. each one data message from said plurality of data messages being similar to transmitted packets and having a same priority; and
  d. each one data message using a different time offset from other data messages;
  e. receiving an acknowledgment and timestamp for each data message;
  f. evaluating statistics concerning the timestamps of the plurality of data messages to determine said effective path bandwidth and received packet spacing for each message; and
  g. selecting said another time to transmit from the plurality of tested time offsets using the offset with first a maximum bandwidth and second a minimum received packet spacing.

8. The method of claim 1 wherein the external timing source is selected from Building Integrated Timing System (BITS), time derived from a global position system (GPS) or a clock system at least as accurate as Stratum-3.

9. An information transmission system comprising:
  a. a time selection component;
  b. a transceiver component; said transceiver component comprising a transmitter subcomponent and a receiver subcomponent; said transmitter subcomponent transmitting at a predetermined time within a predetermined time interval; transmission being in one of a number of predetermined states and transitioning to a next state from the number of predetermined states to establish and maintain communication; said next state not being known apriori from a previous state; said predetermined states comprise a state for service time offset detection and avoidance testing and a state for collision or network alteration detection; said predetermined time being determined by said time selection component; said transmitter subcomponent being synchronized to the predetermined time interval using an external timing source; and another receiver subcomponent being also synchronized to the external timing source; the accuracy of the external timing source selected in order to keep timing of the predetermined interval consistent for entire communication duration; and
  c. a transmission report analysis component; said transmission report analysis component analyzing transmission statistics received by the receiver subcomponent in order to ascertain whether transmission problems occurred; if transmission problems occurred, said transmission report analysis component requesting another predetermined time for transmission from said time selection component.

10. The information transmission system of claim 9 wherein the information transmission system comprises:
  a. a processor; and
  b. non-transitory computer usable media having computer readable code embodied therein; said computer readable code causing said processor to:
    i. select a time to transmit, the time being selected within a predetermined time interval; the one transceiver component transmitting data being synchronized to the predetermined time interval using an external timing source; and said another transceiver component receiving the data being also synchronized to the external timing source; the accuracy of the external timing source selected in order to keep timing of the predetermined interval consistent for entire communication duration; transmission being in one of a number of predetermined states and transitioning to a next state from the number of predetermined states to establish and maintain communication; said next step not being known apriori form a previous state: said predetermined states comprise a state for service time offset detection and avoidance testing and a state for collision or network alteration detection; and
    i. transmit information over the network;
    ii. receive information related to transmission statistics from a receiver component; the information related to transmission statistics utilized to obtain transmission statistics;
    iii. analyze the transmission statistics in order to ascertain whether transmission problems occurred; the transmission problems comprising collisions, network reconfiguration, or preemption;
    iv. select, if transmission problems occurred, another time to transmit; said another time being selected within the predetermined time interval; and
    v. repeat, if transmission problems occurred, steps i) through v).

11. The information transmission system of claim 9 wherein the wherein the external timing source is selected from Building Integrated Timing System (BITS), time derived from a global position system (GPS) or a clock system at least as accurate as Stratum-3.

12. An information receiving system comprising:
  a transceiver component; said transceiver component comprising a receiver subcomponent and a transmitter subcomponent; said receiver subcomponent receiving information from a transmission system; said transmitter subcomponent transmitting at a predetermined time within a predetermined time interval; transmission being in one of a number of predetermined states and transitioning to a next state from the number of predetermined states to establish and maintain communication; said next state not being known apriori from a previous state; said predetermined states comprise a state for service time offset detection and avoidance testing and a state for collision or network alteration detection; said predetermined time being determined by a time selection component; one transmitter subcomponent being synchronized to the predetermined time interval using an external timing source; and said receiver subcomponent being also synchronized to the external timing source; the accuracy of the external timing source selected in order to keep timing of the predetermined interval consistent for entire communication duration; and
  a transmission statistics generation component; said transmission statistics generation component gathering information related to transmission statistics for said received information; said transmitter subcomponent transmitting said gathered statistical information related to transmission statistics to said transmission system.

13. The information receiving system of claim 12 wherein said gathered information relating to transmission statistics comprises an acknowledgment and a timestamp.

14. The information receiving system of claim 13 wherein the information received comprises packets and timestamps and wherein said timestamp is indicative of a time at which one packet was received.

15. The information receiving system of claim 12 wherein said transmission statistics generation component comprises:
   a. a processor; and
   b. non-transitory computer usable media having computer readable code embodied therein; said computer readable code causing said processor to:
      i. gather information related to transmission statistics on said received information; and
      ii. provide said gathered statistics to said transmitter subcomponent.

16. The information receiving system of claim 15 wherein said gathered information relating to transmission statistics comprises an acknowledgment and a timestamp.

17. The information receiving system of claim 16 wherein the information received comprises packets and timestamps wherein said timestamp is indicative of a time at which one packet was received.

18. The information receiving system of claim 12 wherein the external timing source is selected from Building Integrated Timing System (BITS), time derived from a global position system (GPS) or a clock system at least as accurate as Stratum-3.

* * * * *